(12) United States Patent
Zuo et al.

(10) Patent No.: US 10,642,907 B2
(45) Date of Patent: May 5, 2020

(54) PROCESSING SERVICE DATA

(71) Applicant: Alibaba Group Holding Limited, George Town (KY)

(72) Inventors: Zhengbin Zuo, Hangzhou (CN); Junze Yu, Hangzhou (CN)

(73) Assignee: Alibaba Group Holding Limited (KY)

( * ) Notice: Subject to any disclaimer, the term of this patent is extended or adjusted under 35 U.S.C. 154(b) by 415 days.

(21) Appl. No.: 15/524,591

(22) PCT Filed: Nov. 3, 2015

(86) PCT No.: PCT/CN2015/093629
§ 371 (c)(1),
(2) Date: May 4, 2017

(87) PCT Pub. No.: WO2016/074572
PCT Pub. Date: May 19, 2016

(65) Prior Publication Data
US 2018/0189395 A1    Jul. 5, 2018

(30) Foreign Application Priority Data
Nov. 11, 2014    (CN) .......................... 2014 1 0632878

(51) Int. Cl.
*G06F 16/951*    (2019.01)
*G06F 16/27*    (2019.01)
(Continued)

(52) U.S. Cl.
CPC ............ *G06F 16/951* (2019.01); *G06F 16/27* (2019.01); *H04L 29/06* (2013.01); *H04L 29/08* (2013.01); *H04L 67/16* (2013.01); *G06F 16/00* (2019.01)

(58) Field of Classification Search
None
See application file for complete search history.

(56) References Cited

U.S. PATENT DOCUMENTS 4,763,323 A * 8/1988 Nelson ................ H04L 12/4015
370/449
5,878,228 A * 3/1999 Miller .................. H04L 1/1887
370/458
(Continued)

FOREIGN PATENT DOCUMENTS

CN    101483653 B    7/2009
CN    103209195 A    7/2013
(Continued)

*Primary Examiner* — Grace Park
*Assistant Examiner* — Cheryl M Shechtman
(74) *Attorney, Agent, or Firm* — Van Pelt, Yi & James LLP

(57) ABSTRACT

The present application provides a method, a means and a system for processing service data. A method comprises: a receiving means sends to a processing means a query request carrying labeling information to query said processing means whether there locally exists data carrying the labeling information, the labeling information being for identifying data needed by the receiving means to provide a target service. The receiving means receives query result information sent by the processing means. If the query result information indicates that the processing means does not have data carrying the labeling information, the receiving means provides the target service based on the received data carrying labeling information. The present application can determine the completeness of data and ensure the successful provision of services.

18 Claims, 2 Drawing Sheets

101 — A Receiving Means Sends to a Processing Means a Query Request Carrying Labeling Information to Query the Processing Means Whether there Locally Exists Data Carrying the Labeling Information. The Labeling Information is for Identifying Data Needed by the Receiving Means to Provide a Target Service.

102 — The Receiving Means Receives Query Result Information Sent by the Processing Means.

103 — If the Query Result Information Indicates that the Processing Means Does Not have Data Carrying the Labeling Information, the Receiving Means Provides the Target Service Based on the Received Data Carrying the Labeling Information.

(51) Int. Cl.
*G06F 16/00* (2019.01)
*H04L 29/06* (2006.01)
*H04L 29/08* (2006.01)

(56) References Cited

U.S. PATENT DOCUMENTS

| | | |
|---|---|---|
| 6,219,648 B1 | 4/2001 | Jones |
| 6,366,947 B1 | 4/2002 | Kavner |
| 7,319,858 B2 | 1/2008 | Lewis |
| 7,487,262 B2 | 2/2009 | Cardina |
| 7,937,464 B2 | 5/2011 | Ruppert |
| 8,176,064 B2 | 5/2012 | Huomo |
| 8,868,370 B2 | 10/2014 | Shindo |
| 2002/0194434 A1 | 12/2002 | Kurasugi |
| 2007/0005748 A1* | 1/2007 | Ohara ............... H04L 29/06 709/223 |
| 2008/0155056 A1 | 6/2008 | Zimowski |
| 2009/0129377 A1 | 5/2009 | Chamberlain |

FOREIGN PATENT DOCUMENTS

| | | |
|---|---|---|
| CN | 103218454 A | 7/2013 |
| CN | 104703202 A | 6/2015 |
| JP | 2013210701 | 10/2013 |

\* cited by examiner

PROCESSING SERVICE DATA

CROSS REFERENCE TO OTHER APPLICATIONS

This application claims priority to International (PCT) Application No. PCT/CN15/93629 entitled SERVICE DATA PROCESSING METHOD, DEVICE AND SYSTEM, filed Nov. 3, 2015 which is incorporated herein by reference for all purposes, which claims priority to People's Republic of China Patent Application No. 201410632878.7 entitled A METHOD, A MEANS AND A SYSTEM FOR PROCESSING SERVICE DATA, filed Nov. 11, 2014 which is incorporated herein by reference for all purposes.

FIELD OF THE INVENTION

The present application relates to a field of communications technology. In particular, it relates to a method, a means and a system for processing service data.

BACKGROUND OF THE INVENTION

With regard to asynchronous transmission, after the sender has grouped data, the sender can send these groups at any time. The receiver typically cannot determine when these groups will arrive.

Asynchronous transmission disperses synchronous operations over several stages and can greatly reduce a system's risk of simultaneous error occurrence while improving system efficiency. Therefore, it is often used on a large scale. Asynchronous transmission also leads to data completeness problems. That is, the receiver is typically unable to determine whether received data is complete. In the case of service data that relies on data completeness, the fact that the receiver is unable to determine whether received data is complete means that there is a risk of service failure when services are provided on the basis of the received data.

SUMMARY

Several aspects of the present application provide a method, a means and a system for processing service data, which are used to determine data completeness and ensure the successful provision of services.

One aspect of the present application provides a method for processing service data. It comprises:

a receiving means sending to a processing means a query request carrying labeling information to query said processing means whether there locally exists data carrying said labeling information; said labeling information being for identifying data needed by said receiving means to provide the target service;

said receiving means receiving query result information sent by said processing means;

if said query result information indicates that said processing means does not have data carrying said labeling information, said receiving means providing said target service based on the received data carrying labeling information.

Another aspect of the present application provides a method for processing service data. It comprises:

a processing means receiving a query request sent by a receiving means, said query request carrying labeling information, said labeling information being for identifying the data needed by the receiving means to provide a target service;

said processing means using said query request as a basis for querying whether there locally exists data carrying said labeling information;

said processing means sending the query result information to said receiving means so that said receiving means can use said query result information as a basis for determining whether to provide said target service.

Yet another aspect of the present application provides a receiving means, which comprises:

a sending module, for sending query requests carrying labeling information to a processing means so that said processing means can query whether there locally exists data carrying said labeling information; said labeling information being for identifying data needed by said receiving means to provide a target service;

a receiving module, for receiving query result information sent by said processing means;

a service processing module, for providing said target service based on the data carrying said labeling information that was received by said receiving module if said query result information indicates that said processing means does not have data carrying said labeling information.

Yet another aspect of the present application provides a processing means, which comprises:

a receiving module, for receiving a query request sent by the receiving means, said query request carrying labeling information, said labeling information being for identifying data needed by said receiving means to provide a target service;

a querying module, for using said query request as a basis for querying whether there locally exists data carrying said labeling information;

a sending module, for sending the query result information from said querying module to said receiving means so that said receiving means may use said query result information as a basis for determining whether to provide said target service.

Yet another aspect of the present application provides a service data processing system, which comprises: a receiving means, a sending means and a forwarding means;

said sending means, for generating data carrying labeling information and sending data carrying said labeling information to said forwarding means; said labeling information being for identifying data needed by said receiving means to provide a target service;

said forwarding means, for forwarding data carrying said labeling information to said receiving means, and receiving a query request that carries said labeling information and that was sent by said receiving means, using said query request as a basis for querying whether there locally exists data carrying said labeling information, and sending query result information back to said receiving means;

said receiving means, for receiving data that carries said labeling information and that was forwarded by said forwarding means, sending said query request to said forwarding means, receiving said query result information sent back by said forwarding means, and if said query result information indicates that said forwarding means does not locally have data carrying said labeling information, providing said target service based on the received data carrying said labeling information.

In the present application, the receiving means uses labeling information to identify data needed to provide a target service and sends a query request carrying labeling information to a processing means so that the processing means can query whether there locally exists data carrying said labeling information and send back query result information. The query result information sent back by the processing means serves to determine whether all the data needed to provide a target service has been received, i.e., whether the data is complete. If the query result information indicates that the processing means does not have data carrying labeling information that would mean that all the data needed to provide the target service has been received. That is, the data carrying labeling information that has been received by the receiving means is complete. Thereupon, the target service is provided on the basis of the received data carrying the labeling information. This can ensure a successful provision of service.

BRIEF DESCRIPTION OF THE DRAWINGS

Various embodiments of the invention are disclosed in the following detailed description and the accompanying drawings.

In order to describe more clearly the technical schemes in the embodiments of the present application, the drawings needed to describe the embodiments or the prior art are explained briefly below. Obviously, the drawings described below are only some embodiments of the present application. A person with ordinary skill in the art could, without expending inventive effort, acquire other drawings on the basis of these drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

So as to further clarify the objectives, technical schemes and advantages of the present application, the technical scheme of the present application is described clearly and completely below in light of specific embodiments and corresponding drawings of the present application. Obviously, the embodiments described are only some of the embodiments of the present application and are not all the embodiments. All other embodiments obtained on the basis of the embodiments of the present application by persons with ordinary skill in the art shall fall within the scope of protection of the present application so long as no inventive effort is made in the course of obtaining them.

Figure 1:
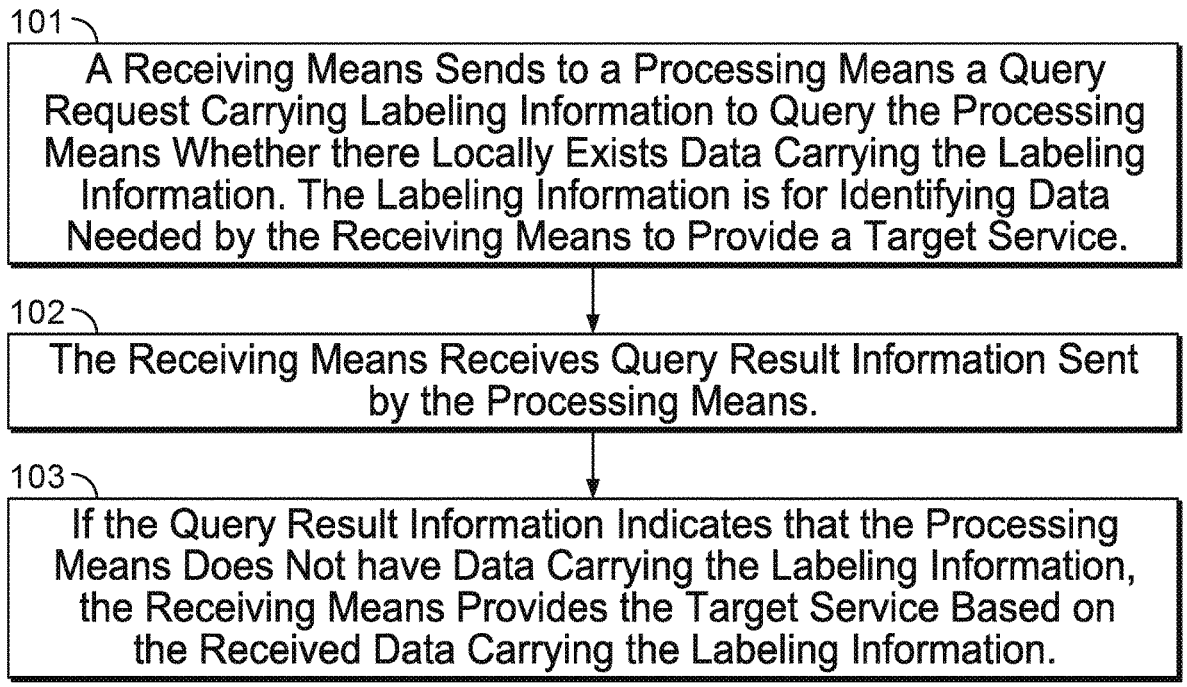
FIG. 1 is a flowchart of a service data processing method provided by an embodiment of the present application.

FIG. 1 is a flowchart of a service data processing method provided by an embodiment of the present application. This method comprises:

101: A receiving means sends to a processing means a query request carrying labeling information to query the processing means whether there locally exists data carrying the labeling information. The labeling information is for identifying data needed by the receiving means to provide a target service.

102: The receiving means receives query result information sent by the processing means.

103: If the query result information indicates that the processing means does not have data carrying the labeling information, the receiving means provides the target service based on the received data carrying the labeling information.

The present embodiment provides a service data processing method that can be executed by a receiving means. The receiving means may be any means that needs to provide the service based on data provided by a processing means. For example, it could be any of various kinds of application clients, servers or terminal devices.

The present embodiment imposes no limitations as to the services provided by the receiving means. Any service that relies on data completeness may be the service that is mentioned in the present embodiment. The data required by different services will not be the same. However, the processing flow for any service will be the same. To facilitate description, the present embodiment takes the provision of any service as an example for the purpose of explanation and calls the service the target service. In the present embodiment, the data needed to provide the target service is identified with labeling information. That is, the data needed to provide the target service carries labeling information.

The processing means is the means responsible for providing data to the receiving means. The processing means sends data carrying labeling information to the receiving means so that the receiving means can provide the target service.

To determine the completeness of the data needed to provide the target service, the receiving means sends a query request carrying labeling information to the processing means so that the processing means can query whether there locally exists data carrying labeling information. As for the processing means, it provides a query service. The information service implements the following functions: it acquires the labeling information from the query request sent by the receiving means, queries whether there locally exists data carrying labeling information and provides the query result information to the receiving means.

In one kind of situation, before receiving the query request, the processing means has already sent all the data needed to provide the target service to the receiving means, which means that the processing means locally does not have data carrying the labeling information. Therefore, the query result information indicates that the processing means locally does not have data carrying the labeling information. In another situation, before it receives the query request, the processing means has not yet sent all the data needed to provide the target service to the receiving means. This means that, after receiving the query request, the processing means locally still has data carrying the labeling information. Therefore, the query result information indicates that the processing means locally has data carrying the labeling information.

On the basis of the above, the receiving means receives query result information sent by the processing means and identifies the query result information. If the query result information indicates that the processing means locally does not have data carrying the labeling information, that means that all of the data needed to provide the target service has been received, i.e., that the data needed to provide the target service is complete. Therefore, the receiving means provides the target service based on the received data carrying the labeling information. In this way, successful provision of the target service can be assured.

Optionally, if the aforesaid query result information indicates that the processing means locally has data carrying the labeling information, that means not all of the data needed to provide the target service has been received, i.e., that the data needed to provide the target service is still incomplete. Thus, it may continue to receive data carrying the labeling information from the processing means so that it can provide the target service after all of the data needed to perform the target service has been received.

A processing means generally sends various kinds of data to a receiving means in accordance with its own scheduling strategy. This "various kinds of data" includes data carrying labeling information. For example, the scheduling strategy could be a priority level strategy, in which case the processing means could successively send various kinds of data according to the priority level of each kind of data. To give another example, the scheduling strategy could be a timed polling strategy. When the receiving means is polled, data carrying the labeling information is sent to the receiving means.

On the basis of the above, if the aforesaid query result information indicates that the processing means locally has data carrying the labeling information, the processing means may continue to send various kinds of data carrying the labeling information to the receiving means in accordance with its own scheduling strategy. This implementation does not need to change the processing means' scheduling strategy and helps to decrease changes in the processing means.

Alternatively, if the aforesaid query result information indicates that the processing means locally has data carrying the labeling information, the receiving means can send a data acquisition request to the processing means to request that the processing means give priority to sending data carrying labeling information. On the basis thereof, the processing means can, in accordance with the data acquisition request, give priority to sending data carrying labeling information. The receiving means continues to receive the data carrying labeling information sent by the processing means. This implementation can promptly acquire the data needed to provide the target service. It helps increase the efficiency and promptness of providing the target service.

In an optional implementation, the processing means can be a means capable of providing data. For example, it could be a sending means that generates data and provides it to the receiving means. Or the processing means could also be located between the sending means and the receiving means and be responsible for forwarding data, i.e., a forwarding means that receives data sent by the sending means and that can forward it to the receiving means.

If the processing means is a receiving means, then, before receiving a query request, the sending means can generate data carrying labeling information and send data carrying the labeling information to the receiving means.

If the processing means is a forwarding means, then, before receiving a query request, the processing means can receive data carrying labeling information sent from the receiving means and, in accordance with its own scheduling strategy, forward data carrying the labeling information to the receiving means. Before forwarding the data carrying the labeling information, the forwarding means can store data carrying the labeling information. For example, it can store data carrying the labeling information in a database. Please note that if, when forwarding data carrying the labeling information to the receiving means, the forwarding means fails to forward the data successfully, the unsuccessfully forwarded data will be stored for further forwarding.

Please note that the labeling information may be various kinds of information capable of uniquely identifying data needed to provide the target service. For example, the labeling information may include: an identifier for the receiving means and an identifier for the target service. These two pieces of information can uniquely identify the target service provided on the receiving means. That is, they uniquely identify the data needed to provide the target service. Or, alternatively, the labeling information might include: the service type associated with the service that generated the data needed to provide the target service and a time identifier. The "service type" can uniquely identify the service that generated the data, i.e., it can uniquely identify the source of the data, while the time segment identifier is used to identify the time segment in which the data needed to provide the target service is located. The data needed to provide the target service can be uniquely identified with these two pieces of information. For example, in the case of data pooling services involving a bank, there is generally a need on day T+1 to pool and classify the different types of service data generated on day T, in which case it is possible to uniquely determine the data needed to provide the pooling service using the service type and the time segment identifier.

In the present embodiment, the receiving means uses labeling information to identify the data needed to provide the target service and sends a query request carrying the labeling information to the processing means so that the processing means can query whether there locally exists data carrying the labeling information and send back the query result information. It uses the query result information sent back by the processing means as a basis for determining whether it has received all the data (i.e., data completeness) needed to provide the target service. If the query result information indicates that the processing means does not have data carrying the labeling information, that indicates that all of the data needed to provide the target service has already been received, i.e., that the data carrying labeling information received by the receiving means is complete. Thereupon, the target service is provided on the basis of the received data carrying the labeling information, which can assure successful provision of the service and furthermore improve performance and efficiency in providing the service.

Figure 2:
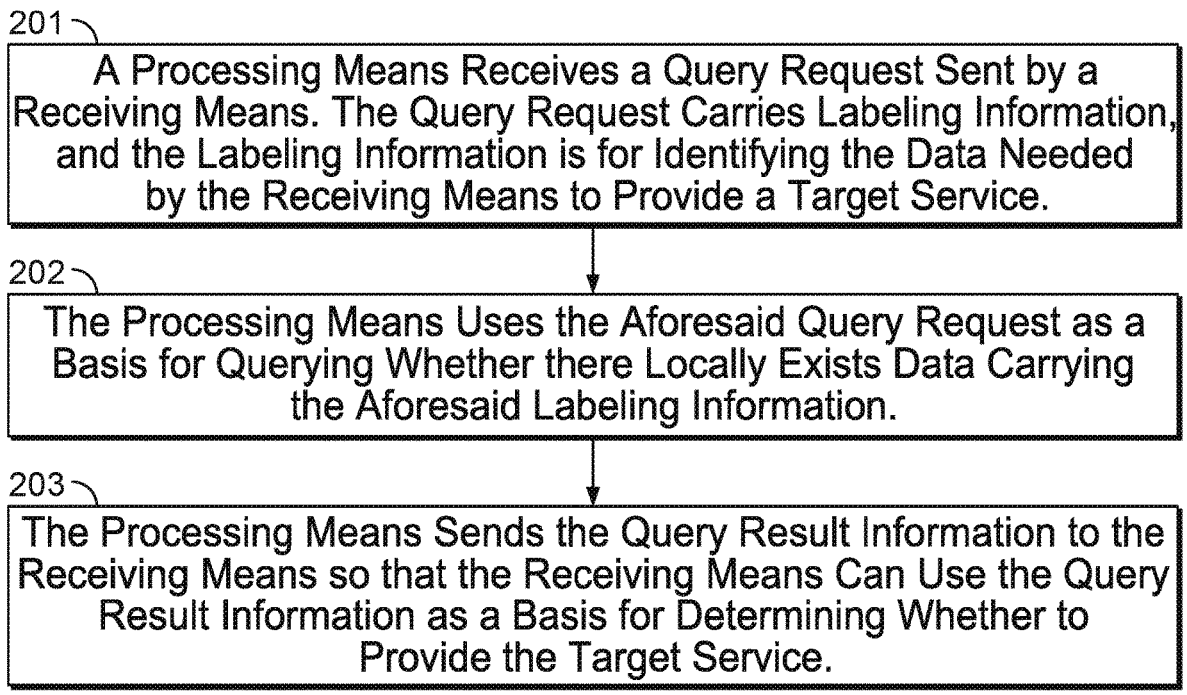
FIG. 2 is a flowchart of a service data processing method provided by another embodiment of the present application.

FIG. 2 is a flowchart of a service data processing method provided by another embodiment of the present application. As shown in FIG. 2, the method comprises:

201: A processing means receives a query request sent by a receiving means. The query request carries labeling information, and the labeling information is for identifying the data needed by the receiving means to provide a target service.

202: The processing means uses the aforesaid query request as a basis for querying whether there locally exists data carrying the aforesaid labeling information.

203: The processing means sends the query result information to the receiving means so that the receiving means can use the query result information as a basis for determining whether to provide the target service.

The present embodiment provides a service data process method that can be executed by a processing means. The processing means is a means responsible for providing data to a receiving means. The processing means sends data carrying labeling information to the receiving means so that the receiving means can provide a target service.

The receiving means can be any means that needs to provide a service based on the data provided by the processing means. For example, it could be any of various application clients, services or terminal devices.

The present embodiment imposes no limitations as to the services provided by the receiving means. Any service that relies on data completeness may be the service that is mentioned in the present embodiment. The data required by different services will not necessarily be the same. However, the processing flow for any service will be the same. To facilitate description, the present embodiment takes the provision of any service as an example for the purpose of explanation and calls the service the target service. In the present embodiment, the data needed to provide the target service is identified with labeling information. That is, the data needed to provide the target service carries labeling information.

To enable the receiving means to determine the completeness of the data needed to provide the target service, the processing means cooperates with the receiving means. It receives a query request carrying labeling information from the receiving means and acquires the labeling information from within the query request. It queries whether there locally exists data carrying the labeling information and provides the query result information to the receiving means. As a result, the receiving means can use the query result information as a basis for determining whether to provide the target service.

In one kind of situation, before receiving the query request, the processing means has already sent all the data needed to provide the target service to the receiving means, which means that the processing means locally does not have data carrying the labeling information. Therefore, the query result information indicates that the processing means locally does not have data carrying the labeling information. In another situation, before receiving the query request, the processing means has not yet sent all the data needed to provide the target service to the receiving means. This means that, after receiving the query request, the processing means locally still has data carrying the labeling information. Therefore, the query result information indicates that the processing means locally has data carrying the labeling information.

On the basis of the above, the process whereby the receiving means uses query result information as a basis for determining whether to provide the target service comprises the following: receiving query result information sent by the processing means and identifying the query result information; if the query result information indicates that the processing means locally does not have data carrying the labeling information, that means all of the data needed to provide the target service has been received, i.e., that the data needed to provide the target service is complete. Therefore, the receiving means provides the target service based on the received data carrying the labeling information. In this way, successful provision of the target service can be assured. If the aforesaid query result information indicates that the processing means locally has data carrying the labeling information, that means not all of the data needed to provide the target service has been received, i.e., that the data needed to provide the target service is still incomplete. Thus, it may continue to receive data carrying the labeling information from the processing means so that it can provide the target service after all of the data needed to perform the target service has been received.

Figure 3A:
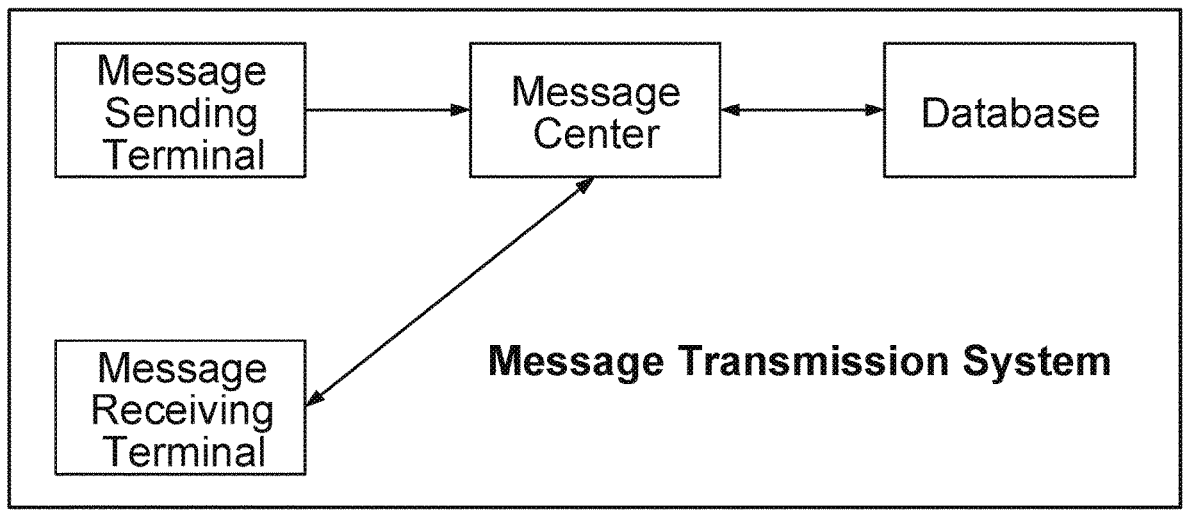
FIG. 3a is a structural diagram of a message transmitting system provided by an embodiment of the present application.

In another implementation, the processing means is a forwarding means that is located between the sending means and the receiving means and that is responsible for forwarding data. On the basis of this, the forwarding means, before receiving a query request sent by the receiving means, receives data carrying labeling information from the sending means and, in accordance with the local scheduling strategy, forwards data carrying the labeling information to the receiving means. A specific application scenario is the message transmission system shown in FIG. 3a. To take the example of a message transmission system, the processing means may serve as a message center within the message transmission system; the sending means may serve as a message sending terminal within the message transmission system; and the receiving means may serve as a message receiving terminal within the message transmission system.

The message sending terminal sends a message carrying labeling information to the message center. The message center receives the message carrying the labeling information, stores the received message in a database and, in accordance with the local scheduling strategy sends the message carrying the label to the message receiving terminal. When forwarding fails, the database will develop a backlog of messages. When the message receiving terminal needs to provide a service, it can query the message center and, in accordance with the query result information sent back by the message center, determine whether to continue to provide the service.

In another optional implementation, the processing means is a sending means that generates data and sends data to the receiving means. On this basis, before receiving a query request sent by the receiving means, the sending means generates data carrying labeling information and sends the data carrying labeling information to the receiving means. For example, the sending means can, in accordance with the local scheduling strategy, send data carrying labeling information to the receiving means.

On the basis of each of the optional implementations described above, in cases where the query result information indicates that the processing means has data carrying labeling information, the processing means can, in accordance with the local scheduling strategy, continue to send data carrying labeling information to the receiving means. This implementation does not require a change in the processing means' scheduling strategy, and it can decrease changes to the processing means. Or, in cases where the query result information indicates that the processing means has data carrying labeling information, the processing means may also receive a data acquisition request that was sent by the receiving means and that is used to request that the processing means give priority to sending data carrying the labeling information. The processing means uses the data acquisition request as a basis for sending data carrying the labeling information to the receiving means. This implementation may promptly provide data to the receiving means and helps to improve efficiency and promptness of the target service provided by the receiving means. Please note that the processing means here may be a sending means or a forwarding means.

Please note that the labeling information may be various kinds of information capable of uniquely identifying data needed to provide the target service. For example, the labeling information may include: an identifier for the receiving means and an identifier for the target service. These two pieces of information can uniquely identify the target service provided on the receiving means. That is, they uniquely identify the data needed to provide the target service. Or, alternatively, the labeling information might include: the service type associated with the service that generated the data needed to provide the target service and a time identifier. The "service type" can uniquely identify the service that generated the data, i.e., it can uniquely identify the source of the data, while the time segment identifier is used to identify the time segment in which the data needed to provide the target service is located. The data needed to provide the target service can be uniquely identified with these two pieces of information. For example, in the case of data pooling services involving a bank, there is generally a need on day T+1 to pool and classify the different types of service data generated on day T, in which case it is possible to uniquely determine the data needed to provide the pooling service using the service type and the time segment identifier.

In the present embodiment, the processing means cooperates with the receiving means. It receives a query request carrying the labeling information from the receiving means, uses the query request as a basis for querying whether there locally exists data carrying the labeling information, and sends back the query result information, with the result that the receiving means determines, on the basis of the query result information sent back by the processing means, whether all the data needed to provide the target service has been received (i.e., data completeness). It then determines whether to provide the target service. It can thus assure successful provision of the service and furthermore improve performance and efficiency in providing the service.

Please note that each method embodiment described above has, for the sake of simplicity of description, been expressed as the combination of a series of actions. However, persons skilled in the art should know that the present application is not limited by the sequence of the actions described because certain steps can be performed in other sequences or simultaneously according to the present application. Furthermore, persons skilled in the art should also know that the embodiments described in the specification are preferred embodiments and that the actions and modules involved therein are not necessarily required by the present application.

In the embodiments described above, the description of each embodiment has its own emphasis. If part of a particular embodiment lacks detailed description, one may refer to the relevant description in the other embodiments.

Figure 3B:
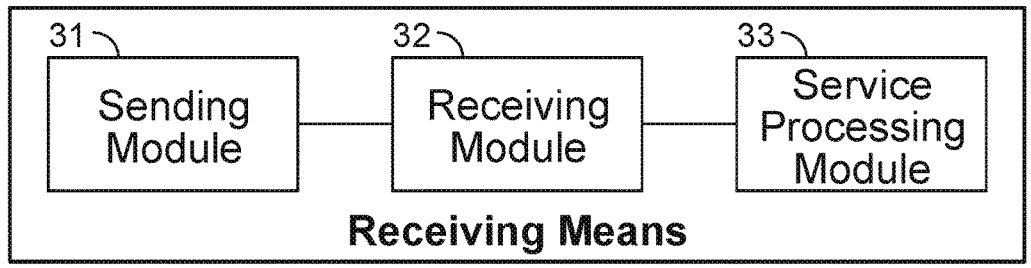
FIG. 3b is a structural diagram of a receiving means provided by an embodiment of the present application.

FIG. 3b is a structural diagram of a receiving means provided by an embodiment of the present application. As shown in FIG. 3b, the receiving means comprises: a sending module 31, a receiving module 32 and a service processing module 33.

The sending module 31 is for sending query requests carrying labeling information to a processing means so that said processing means can query whether there locally exists data carrying said labeling information, said labeling information being for identifying data needed by said receiving means to provide a target service.

The receiving module 32 is for receiving query result information sent by said processing means.

The service processing module 33, which is connected to the receiving module 32, is for providing said target service based on the data carrying said labeling information that was received by the receiving module 32 if the query result information received by said receiving module indicates that said processing means does not have data carrying said labeling information.

In an optional implementation, the sending module 31 may further be for sending a data acquisition request to said processing means when the query result information received by the receiving module 32 indicates that said processing means has data carrying said labeling information to request that said processing means give priority to sending data carrying said labeling information. Accordingly, the receiving module 32 is further for continuing to receive data that is sent by said processing module and that carries said labeling information.

In an optional implementation, the processing means is a forwarding means that is located between the sending means and the receiving means and that is responsible for forwarding data. Or said processing means is a sending means.

In an optional implementation, the aforesaid labeling information may comprise: the service type associated with the service that generated the data needed to provide the target service and the time segment identifier used to identify the time segment in which the data needed to provide said target service is located.

The receiving means provided by the present embodiment may be any means that needs to provide the service based on data provided by a processing means. For example, it could be any of various kinds of application clients, servers or terminal devices.

The receiving means provided by the present embodiment uses labeling information to identify the data needed to provide the target service and sends a query request carrying the labeling information to the processing means so that the processing means can query whether there locally exists data carrying the labeling information and send back the query result information. It uses the query result information sent back by the processing means as a basis for determining whether it has received all the data (i.e., data completeness) needed to provide the target service. If the query result information indicates that the processing means does not have data carrying the labeling information, that shows that all of the data needed to provide the target service has already been received, i.e., that the data carrying labeling information received by the receiving means is complete. Thereupon, the target service is provided on the basis of the received data carrying the labeling information, which can assure successful provision of the service and furthermore improve performance and efficiency in providing the service.

Figure 4:
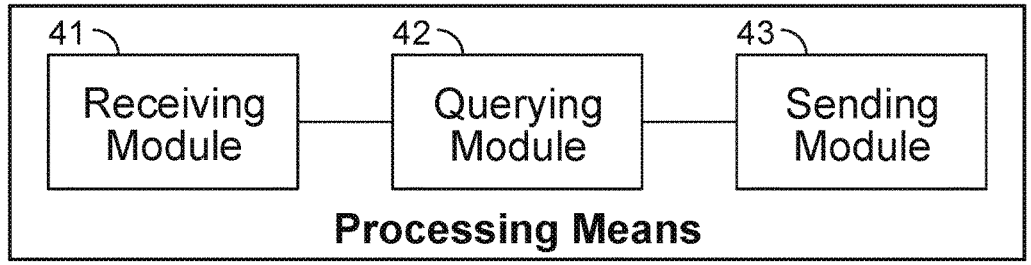
FIG. 4 is a structural diagram of a processing means provided by an embodiment of the present application.

FIG. 4 is a structural diagram of a processing means provided by an embodiment of the present application. As shown in FIG. 4, the means comprises: a receiving module 41, a querying module 42 and a sending module 43.

The receiving module 41 is for receiving a query request sent by a receiving means, said query request carrying labeling information and said labeling information being for identifying data needed by said receiving means to provide a target service.

The querying module 42, which is connected to the receiving module 41, is for using the query request received by said receiving module 41 as a basis for querying whether there locally exists data carrying said labeling information.

The sending module 43, which is connected to the querying module 42, is for sending the query result information from said querying module 42 to said receiving means so that said receiving means may use said query result information as a basis for determining whether to provide said target service.

In an optional implementation, the processing means is a forwarding means that is located between the sending means and the receiving means and that is responsible for forwarding data. On the basis of this, the receiving module 41 is further for receiving data carrying said labeling information from said sending module. Accordingly, the sending module 43 is further for forwarding data carrying said labeling information to said receiving module in accordance with a local scheduling strategy.

In an optional implementation, the processing means is a sending means. On the basis of this, the sending means further comprises: a generating module, for generating data carrying said labeling information. Accordingly, the sending module 43 is further for sending data carrying said labeling information to said receiving means.

In an optional implementation, the receiving module 41 is further for, when said query result information indicates said processing means has data carrying said labeling information, receiving a data acquisition request sent from said receiving means for requesting that said processing means give priority in sending data carrying said labeling information. Correspondingly, said sending module 43 is further for sending data carrying said labeling information to said receiving means in accordance with said data acquisition request.

In an optional implementation, the aforesaid labeling information may comprise: the service type associated with the service that generated the data needed to provide the target service and the time segment identifier used to identify the time segment in which the data needed to provide said target service is located.

The processing means provided by the present embodiment cooperates with the receiving means and, by receiving a query request carrying labeling information sent from the receiving means, using the query request as a basis for querying whether data carrying the labeling information exists locally, and sending back query result information, it causes the receiving means to determine, in accordance with the query result information sent back by the processing means, whether all of the data needed to provide the target service has been received (i.e., data completeness) and then to determine whether to provide the target service. This can ensure successful provision of the service and furthermore improve performance and efficiency in providing the service.

Figure 5:
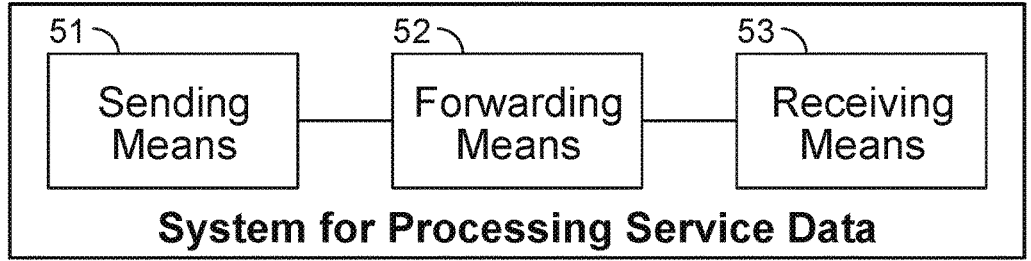
FIG. 5 is a structural diagram of a service data processing system provided by an embodiment of the present application.

FIG. 5 is a structural diagram of a service data processing system provided by an embodiment of the present application. As shown in FIG. 5, the system comprises: a sending means 51, a forwarding means 52 and a receiving means 53.

The sending means 51 is for generating data carrying labeling information and sending data carrying said labeling information to said forwarding means. Said labeling information is for identifying data needed by said receiving means to provide a target service.

The forwarding means 52 is for forwarding data carrying said labeling information to said receiving means, receiving a query request that carries said labeling information and that was sent by said receiving means, using said query request as a basis for querying whether there locally exists data carrying said labeling information, and sending query result information back to said receiving means.

The receiving means 53 is for receiving data that carries said labeling information and that was forwarded by said forwarding means, sending said query request to said forwarding means, receiving said query result information sent back by said forwarding means, and if said query result information indicates that said forwarding means does not locally have data carrying said labeling information, providing said target service based on the received data carrying said labeling information.

For the specific operating principles and specific implementation structures of the sending means 51, the forwarding means 52 and the receiving means 53, one may refer to the appropriate method embodiments and means embodiments described above. They will not be discussed further here.

In the system provided by the present embodiment, the sending means, the forwarding means and the receiving means cooperate with each other. The sending means sends data carrying labeling information to the receiving means via the forwarding means. The forwarding means, by receiving from the receiving means the query request carrying the labeling information, uses the query request as a basis for querying whether there locally exists data carrying the labeling information, and sends back query result information, with the result that the receiving means, in accordance with query result information sent back by the processing means, determines whether all of the data needed to provide the target service has been received (i.e., data completeness). It thereupon determines whether to provide the target service. This can ensure successful provision of the service and furthermore improve performance and efficiency in providing the service.

Persons skilled in the art may clearly understand that, for the sake of descriptive convenience and streamlining, information on the specific operating processes of the systems, means and modules described above can be referenced in the corresponding process in the aforesaid method embodiments. They will not be discussed further here.

In several embodiments provided by the present application, please understand that the disclosed systems, means and methods may be realized in other ways. For example, the means embodiments described above are merely illustrative. For example, the division into said modules is merely a division by logical function. When actually implemented, there may be other forms of division. For example, multiple modules or components may be combined or integrated into another system, or some features might be omitted or not executed. In addition, mutual couplings or direct couplings or communication connections that are displayed or discussed may be indirect couplings or communication connections through some interfaces, devices or modules. They may be electrical or mechanical or take another form.

The modules described as separate components may or may not be physically separate, and components displayed as modules may or may not be physical modules. They may be located in one place, or they may be distributed across multiple network modules. The schemes of the present embodiments can be realized by selecting part or all of the modules in accordance with actual need.

In addition, each functional module in each of the embodiments of the present application may be integrated into a processing module, or each module may have an independent physical existence. Or two or more modules may be integrated into one module. The aforesaid integrated modules may take the form of hardware, or they may take the form of hardware combined with software function modules.

The modules described above in which the software function modules are integrated may be stored in computer-readable storage media. The aforesaid software function modules are stored in storage media, including some commands for causing a computer device (which could be a personal computer, a server, or a network device) or a processor to execute some of the steps in the methods described by the various embodiments of the present application. The storage media described above encompass: USB flash drives, mobile hard drives, read-only memory (ROM), random access memory (RAM), magnetic disks or optical disks, or various other media that can store program code.

The above embodiments serve only to explain the technical schemes of the present application and not to limit it. Although the present application was explained in detail with reference to the above-described embodiments, persons with ordinary skill in the art should understand that they may modify the technical schemes recorded in the various embodiments described above or provide equivalent substitutions for some of their technical features. Yet these modifications or substitutions do not cause the corresponding technical schemes to substantively depart from the spirit and scope of the technical schemes of the various embodiments of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving, at a receiving system, data that is needed to provide a target service from a processing system, wherein the data that is needed to provide the target service is received according to a local scheduling strategy associated with the processing system;
   sending, from the receiving system, a query request to the processing system, wherein the query request comprises labeling information that uniquely identifies the data that is needed to provide the target service;
   receiving, at the receiving system, a query result corresponding to the query request from the processing system, wherein the query result comprises data that indicates whether data associated with the labeling information exists locally at the processing system; and
   determining, at the receiving system, whether the data needed to provide the target service has already been completely received, based at least in part on determining whether the query result indicates that the data associated with the labeling information exists locally at the processing system;
   wherein in response to the query result indicating that the data associated with the labeling information does exist locally at the processing system, the method further comprises:
      determining, at the receiving system, that the data needed to provide the target service is not completely received from the processing system; and
      sending, from the receiving system, a data acquisition request to request priority for sending the data associated with the labeling information, wherein the processing system is configured to use the data acquisition request as a basis for giving priority to sending the data that is needed to provide the target service to the receiving system.

2. The method of claim 1, wherein the labeling information comprises an identifier associated with the receiving system and an identifier associated with the target service.

3. The method of claim 1, wherein the labeling information comprises a service type associated with a source that generated the data that is needed to provide the target service and a time identifier that identifies a time segment in which the generated data that is needed to provide the target service is located.

4. The method of claim 1, wherein the query request comprises a first query request, wherein the query result comprises a first query result, the method further comprising:
   sending, from the receiving system, a second query request to the processing system, wherein the second query request comprises the labeling information that uniquely identifies the data that is needed to provide the target service; and
   receiving, at the receiving system, a second query result corresponding to the second query request from the processing system, wherein the second query result comprises data that indicates whether the data associated with the labeling information exists locally at the processing system;
   wherein in response to the second query result indicating that the data associated with the labeling information does not exist locally at the processing system, further comprising:
      determining, at the receiving system, that the data needed to provide the target service is completely received from the processing system; and
      providing, at the receiving system, the target service based at least in part on received data associated with the labeling information.

5. The method of claim 1, wherein in response to the query result indicating that the data associated with the labeling information does exist locally at the processing system, further comprising:
   receiving the data associated with the labeling information from the processing system.

6. A receiving system, comprising:
   one or more processors configured to:
      receive data that is needed to provide a target service from a processing system, wherein the data that is needed to provide the target service is received according to a local scheduling strategy associated with the processing system;
      send a query request to the processing system, wherein the query request comprises labeling information that uniquely identifies the data that is needed to provide the target service;

receive a query result corresponding to the query request from the processing system, wherein the query result comprises data that indicates whether data associated with the labeling information exists locally at the processing system; and determine whether the data needed to provide the target service has already been completely received based at least in part on determining whether the query result indicates that the data associated with the labeling information exists locally at the processing system;

wherein in response to the query result indicating that the data associated with the labeling information does exist locally at the processing system, the one or more processors are further configured to:

determine that the data needed to provide the target service is not completely received from the processing system; and send a data acquisition request to request priority for sending the data associated with the labeling information, wherein the processing system is configured to use the data acquisition request as a basis for giving priority to sending the data that is needed to provide the target service to the receiving system; and one or more memories coupled to the one or more processors and configured to provide the one or more processors with instructions.

7. The receiving system of claim 6, wherein the query request comprises a first query request, wherein the query result comprises a first query result, wherein the one or more processors are further configured to:

send a second query request to the processing system, wherein the second query request comprises the labeling information that uniquely identifies the data that is needed to provide the target service; and receive a second query result corresponding to the second query request from the processing system, wherein the second query result comprises data that indicates whether the data associated with the labeling information exists locally at the processing system;

wherein in response to the second query result indicating that the data associated with the labeling information does not exist locally at the processing system, wherein the one or more processors are further configured to:

determine that the data needed to provide the target service is completely received from the processing system; and provide the target service based at least in part on the received data associated with the labeling information.

8. The receiving system of claim 6, wherein in response to the query result indicating that the data associated with the labeling information does exist locally at the processing system, wherein the one or more processors are further configured to:

receive the data associated with the labeling information from the processing system.

9. The receiving system of claim 6, wherein the labeling information comprises an identifier associated with the receiving system and an identifier associated with the target service.

10. The receiving system of claim 6, wherein the labeling information comprises a service type associated with a source that generated the data that is needed to provide the target service and a time identifier that identifies a time segment in which the generated data that is needed to provide the target service is located.

11. A method, comprising:

sending, from a processing system, data that is needed to provide a target service to a receiving system, wherein the data that is needed to provide the target service is sent according to a local scheduling strategy associated with the processing system;

receiving, at the processing system, a query request from the receiving system, wherein the query request comprises labeling information that uniquely identifies the data that is needed to provide the target service;

determining, at the processing system, whether data associated with the labeling information exists locally;

generating, at the processing system, a query result based at least in part on the determination of whether the data associated with the labeling information exists locally;

sending, from the processing system, the query result to the receiving system, wherein the receiving system is configured to use the query result to determine whether the data that is needed to provide the target service has already been completely received at the receiving system;

wherein in response to the query result indicating that the data associated with the labeling information does exist locally at the processing system, the method further comprises:

receiving, at the processing system, a data acquisition request to request priority for sending the data associated with the labeling information; and using, at the processing system, the data acquisition request as a basis for giving priority to sending the data that is needed to provide the target service to the receiving system.

12. The method of claim 11, wherein the labeling information comprises an identifier associated with the receiving system and an identifier associated with the target service.

13. The method of claim 11, wherein the labeling information comprises a service type associated with a source that generated the data that is needed to provide the target service and a time identifier that identifies a time segment in which the generated data that is needed to provide the target service is located.

14. The method of claim 11, further comprising, prior to receipt of the query request:

receiving the data associated with the labeling information from a sending system.

15. The method of claim 11, wherein determining whether the data associated with the labeling information exists locally comprises querying a local database for the data associated with the labeling information.

16. A processing system, comprising:

one or more processors configured to:

send data that is needed to provide a target service to a receiving system, wherein the data that is needed to provide the target service is sent according to a local scheduling strategy associated with the processing system;

receive a query request from the receiving system, wherein the query request comprises labeling information that uniquely identifies the data that is needed to provide the target service;

determine whether data associated with the labeling information exists locally;

generate a query result based at least in part on the determination of whether the data associated with the labeling information exists locally; and send the query result to the receiving system, wherein the receiving system is configured to use the query result to determine whether the data that is needed to provide the target service has already been completely received at the receiving system;

wherein in response to the query result indicating that the data associated with the labeling information does exist locally at the processing system, the one or more processors are further configured to:

receive a data acquisition request to request priority for sending the data associated with the labeling information; and use the data acquisition request as a basis for giving priority to sending the data that is needed to provide the target service to the receiving system; and one or more memories coupled to the one or more processors and configured to provide the one or more processors with instructions.

17. The processing system of claim 16, wherein the labeling information comprises an identifier associated with the receiving system and an identifier associated with the target service.

18. The processing system of claim 16, wherein to determine whether the data associated with the labeling information exists locally comprises querying a local database for the data associated with the labeling information.

* * * * *